(12) United States Patent
Schrunner et al.

(10) Patent No.: US 9,874,291 B2
(45) Date of Patent: Jan. 23, 2018

(54) FLUID CONTROL VALVE

(71) Applicant: SANDVIK INTELLECTUAL PROPERTY AB, Sandviken (SE)

(72) Inventors: Christian Schrunner, Weisskirchen (AT); Markus Wenegger, Zeltweg (AT); Kurt Schaffer, Seckau (AT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/116,555

(22) PCT Filed: Jan. 26, 2015

(86) PCT No.: PCT/EP2015/051432
§ 371 (c)(1),
(2) Date: Aug. 4, 2016

(87) PCT Pub. No.: WO2015/117845
PCT Pub. Date: Aug. 13, 2015

(65) Prior Publication Data
US 2016/0341329 A1 Nov. 24, 2016

(30) Foreign Application Priority Data
Feb. 7, 2014 (EP) .................... 14154315

(51) Int. Cl.
| | |
|---|---|
| *F16K 11/20* | (2006.01) |
| *F16K 31/122* | (2006.01) |
| *E21C 35/23* | (2006.01) |
| *F16K 27/02* | (2006.01) |
| *F16K 1/12* | (2006.01) |
| *F16K 27/00* | (2006.01) |

(52) U.S. Cl.
CPC .......... *F16K 31/1221* (2013.01); *E21C 35/23* (2013.01); *F16K 1/126* (2013.01); *F16K 27/003* (2013.01); *F16K 27/0254* (2013.01)

(58) Field of Classification Search
CPC ............... F16K 31/1221; F16K 31/363; F15B 13/0814; F15B 13/0835; F15B 13/0842; F15B 2013/004
USPC .. 137/315.11, 454.2, 594, 596.18, 597, 884; 251/61, 61.4, 339
See application file for complete search history.

(56) References Cited

U.S. PATENT DOCUMENTS 3,672,629 A * 6/1972 Sorteberg .............. F16K 31/126
  137/627.5
4,248,188 A * 2/1981 Wilson .................... F02D 1/065
  123/371

(Continued)

FOREIGN PATENT DOCUMENTS

DE     29514272 U1    12/1995
DE   202010016414 U1    3/2001
(Continued)

*Primary Examiner* — Reinaldo Sanchez-Medina
(74) *Attorney, Agent, or Firm* — Corinne R. Gorski

(57) ABSTRACT

A cartridge valve is arranged to control a flow of a fluid within a fluid supply network of a cutting machine such as mining or drilling apparatus. The valve includes a main body that defines an internal chamber to accommodate a reciprocating piston and plunger operative to open and close the valve by axial sliding movement. An intermediate region of the chamber provides a fluid tight partition between a working fluid network and a supply fluid network.

15 Claims, 4 Drawing Sheets

(56) References Cited

U.S. PATENT DOCUMENTS

| | | | |
|---|---|---|---|
| 4,376,671 A * | 3/1983 | Schulz | B32B 3/28 |
| | | | 156/549 |
| 4,399,836 A * | 8/1983 | de Versterre | F15B 13/0405 |
| | | | 137/487.5 |
| 4,721,341 A | 1/1988 | Maschewski | |
| 4,852,947 A | 8/1989 | Jones | |
| 5,778,918 A | 7/1998 | McLelland | |
| 6,041,804 A | 3/2000 | Chatufale | |
| 6,070,944 A | 6/2000 | Lebegue | |
| 6,142,171 A * | 11/2000 | Hancock | F16K 27/003 |
| | | | 137/271 |
| 6,422,531 B1 | 7/2002 | Sich | |
| 6,497,251 B1 | 12/2002 | Watson | |
| 8,061,434 B2 | 11/2011 | Keskiniva et al. | |
| 8,726,935 B2 * | 5/2014 | Leys | B01F 5/0077 |
| | | | 137/597 |
| 2006/0038154 A1 | 2/2006 | Fukano et al. | |

FOREIGN PATENT DOCUMENTS

| | | |
|---|---|---|
| EP | 0111143 B1 | 7/1988 |
| GB | 1110763 A | 4/1968 |
| GB | 2333548 B | 12/2001 |

* cited by examiner

FLUID CONTROL VALVE

RELATED APPLICATION DATA

This application is a §371 National Stage Application of PCT International Application No. PCT/EP2015/051432 filed Jan. 26, 2015 claiming priority of EP Application No. 14154315.7, filed Feb. 7, 2014.

FIELD OF INVENTION

A fluid flow control valve to form part of a fluid network and in particular, although not exclusively, a water supply network associated with a cutting machine including in particular a mining and a drilling machine.

BACKGROUND ART

A variety of different methods and machines have been developed to extract mineral and fossil fuels at and below the earth's surface. Typically, cutting machines have been developed to maximise excavation recovery and drilling efficiency. In particular, within a mining environment, a variety of different machines have been developed for specific purposes. Whilst some machines are configured exclusively to cut mineral from a deposit or rock, other machines are configured to tunnel within the subterranean depth to effectively create the mine and provide passageways for the mineral cutters. Mobile mining machines typically comprise a rotatable cutting or mining head having cutting bits provided on rotating drums that contact the rock face. As the cutting head is rotated and advanced into the seam, the extracted mineral is gathered by a gathering head and then conveyed rearwardly by the machine via a conveying apparatus. Conventionally, water spray nozzles are mounted at the cutting head adjacent each cutting bit to suppress the generation of airborne dust that would otherwise pollute the environment surrounding the mine and present a frictional ignition medium. Water is fed continuously to the spray nozzles during head rotation for instantaneous dust suppression. The water spray is further advantageous to reduce frictional contact between the material deposit and the cutting bits so as to extend the bit lifetimes. The water supply network typically comprises one or a plurality of fluid control valves to control the high pressure water delivery to each bit optionally by a pulsing supply action. Example water supply systems and valve arrangements are described in GB 1,110,763; EP 0111143; DE 386651, U.S. Pat. No. 4,721,341; GB 2333548 and U.S. Pat. No. 6,070,944.

Percussion drilling is a well-established technique that breaks rock by hammering impacts transferred from a rock drill bit mounted at one end of a drill string to the rock at the bottom of a borehole. The fragmented rock pieces are flushed rearwardly along the borehole by a flushing fluid that is controlled and supplied via a pressurised fluid delivered to the drill bit. One or more valves are provided at the delivery end of the fluid network to control the supply of pressurised fluid. Example fluid supply networks are described in U.S. Pat. No. 8,061,434 and U.S. Pat. No. 4,852,947.

However, conventional fluid control valve arrangements are disadvantageous for a number of reasons. In particular, the control valves are typically hydraulically actuated via a piston and plunger arrangement and it is not uncommon for seals that partition the water network from the oil network to fail resulting in contamination of one or both circuits. Additionally, working components of the valve are commonly exposed to the fluid supply network and degrade or become impeded by particulates within the water circuit that inhibit valve performance. Furthermore, conventional valve arrangements are generally bulky so as to withstand the harsh working environments typically associated with miners or dust laden environments. Where a plurality of control valves are utilised within a fluid network, the overall size of the valve assembly is often prohibitive for convenient mounting at a mobile mining or cutting machine. Accordingly, what is required is a valve and valve assembly to form part of a fluid supply network that addresses the above problems.

SUMMARY OF THE INVENTION

It is an objective of the present invention to provide a compact cartridge valve and a valve assembly to form a component part of a fluid supply network associated with a cutting machine and in particular a mining or drilling machine that utilises a supply fluid to both suppress particulate and dust generation and/or to provide flushing of cut fragments away from the cutting region.

It is a further specific objective to provide a valve in which the internal working components of the valve are isolated, as far as possible from the fluid supply network and a working fluid network that provides actuation and control (on and off) of the valve. Such an arrangement is advantageous to minimise contamination, corrosion and otherwise degradation of the valve components during use. An additional further objective is to provide a cartridge valve that allows operational personnel to detect conveniently the failure of one or more internal valve seals immediately after failure to avoid subsequent contamination of the fluid supply and working fluid circuits.

The objectives are achieved by providing a fluid control valve having a compact construction and in which selected internal working components of the valve are separated and isolated from both the supply fluid and working fluid network. In particular, a main body defines a valve chamber that mounts a bias component, optionally in the form of a coil spring, that is isolated from fluid communication with the fluid networks. The compact construction is provided by positioning the bias member to surround an axially movable plunger that extends to one side of a piston within the valve body. The overall axial length of the valve is minimised as the plunger is specifically configured to act directly on the inlet and/or the outlet such that the plunger and in particular the sealing end of the plunger is controlled and acted upon by the biased member. This has the further advantage of providing a default 'closed' state of the valve (via the bias member) in contrast to a conventional 'check valves' in which a fluid supply is responsible for closing the valve.

The valve chamber that houses the bias member is positioned axially intermediate the fluid supply network and the working fluid network such that any cross contamination between the fluid circuits must otherwise occur via the valve chamber. Advantageously, internal seal failure detection is achieved via at least one detection port provided through the cartridge body at the region of the valve main chamber. Accordingly, any contamination of the valve chamber by the working fluid or the supply fluid is identifiable via seepage through the detection port. Cross contamination of the fluid supply and working fluid networks is therefore possible via a convenient visual inspection of the valve from outside without the need to dismantle the valve or parts of the network.

According to a first aspect of the present invention there is provided a cartridge valve for fluid flow control comprising: a cartridge defining a first internal chamber and a working fluid chamber, the working fluid chamber separated and partitioned from fluid communication with the first chamber via a piston; a valve plunger extending through the first chamber and having a first end and second end; the piston attached to the plunger at or towards the first end, the working fluid chamber capable of accommodating a working fluid and positioned to allow the working fluid to act on the piston and to provide an axial movement of the piston and the plunger within the cartridge; a bias member housed within the first chamber to bias the piston against the axial movement; an inlet and an outlet for a supply fluid to flow through a portion of the valve and be controlled by the valve via the axial movement of the plunger relative to the inlet and/or the outlet, the inlet and outlet partitioned from the first chamber by at least one seal; the second end of the valve plunger is configured to mate with the inlet or the outlet or a region therebetween so as to close the inlet or the outlet or to block a fluid flow between the inlet and the outlet via the return force of the bias member.

Optionally, the plunger may act on a region of the valve in the vicinity of the inlet or outlet so as to restrict or completely block a fluid flow passageway between these two regions and hence prevent a flow of fluid through the valve.

Preferably, each detection port comprises a filter to restrict the flow of a fluid or particulates through the port and into the first chamber. The filter acts to protect the internal chamber and working components within the chamber of the valve from contamination by the environment surrounding the valve and in particular moisture, particulates and other fluids and solids that may act to degrade or impede movement of the internal components of the valve. Optionally, each port comprises a sintered metal matrix having an open structure to allow the through flow of a fluid into the internal chamber. In particular, and according to one aspect the sintered metal matrix comprises a brass alloy formed from a plurality of metal balls fused together to form an open lattice unitary body. Advantageously, the filter membrane comprises a rigid structure to be resistant to any deformation resultant from a differential pressure at the internal chamber and the surrounding environment. Such an arrangement using a metal matrix filter provides the required porosity to allow liquid seepage outwardly from the chamber whilst being affective to prevent air entrained particulates from passing into the chamber.

Optionally, the cartridge defines the working fluid chamber such that the piston is positioned within the cartridge to partition the first chamber from the working fluid chamber. Advantageously the cartridge defines both the first and working fluid chambers (being partitioned via the piston) to achieve a compact valve construction for convenient installation at cutting machines having minimum available mounting space or regions. Additionally, to facilitate a compact construction, the inlet and the outlet are positioned at or towards a first axial end of the valve and the working fluid chamber is positioned at or towards an opposite second axial end of the valve.

Preferably, the valve further comprises at least one seal provided at the piston to provide a fluid tight seal between the first chamber and the working fluid chamber. Optionally, the valve at the region of the piston may comprise multiple seals distributed axially at the radially outward facing surface of the piston for contact with the radially inward facing surface of the valve body that defines the chamber. Optionally, the piston may be self-lubricating and sealing at the internal surface of the valve chamber and may be devoid of separate seals. Optionally, the valve may comprise a plurality of additional seals positioned between and configured to axially partition the first chamber from the working fluid chamber so as to prevent cross-contamination. According to the preferred embodiment, the first chamber is positioned axially intermediate the working fluid chamber and the region of the valve that allows the through-flow of the supply fluid. Such an arrangement is advantageous to provide an air filled void or cavity region within the valve that serves as a temporary reservoir for any contaminant fluid leaked from either of the working or supply fluid networks. Optionally, the first chamber may be filled with and can accommodate the working fluid so as to be pressurised at or close to a supply pressure of the working fluid.

Preferably, the first chamber is positioned axially between the inlet and/or outlet and the working fluid chamber to provide convenient separation of the fluids networks via a compact valve construction.

Preferably, the cartridge comprises a working fluid port to allow the working fluid to flow to and from the working fluid chamber to act on the piston. Optionally, the working fluid port is provided at an opposite end of the valve relative to the inlet and outlet. Optionally, the valve comprises a plurality of working fluid ports in the form of inlets and outlets. Such an arrangement is advantageous to allow the controlled transfer of the working fluid to and from the valve and to accordingly control the stroke length of the plunger and hence the valve opening and closing.

Optionally, the bias member comprises a coil spring. Optionally, the bias member comprises a first coil spring having a first diameter and a second coil spring having a second diameter being less than the first diameter. One or more coil springs are advantageous for positioning immediately around the plunger to provide a minimised valve construction and in particular a minimised diameter of the valve chamber and hence the overall diameter of the valve. Utilising a plurality of coil springs is further advantageous to provide a desired magnitude of return force to the plunger being proportional to the extent of axial compression.

Preferably, the piston extends from the axial end of the bias member such that the piston and the bias member do not axially overlap within the cartridge main body and in particular the first chamber. Such an arrangement is advantageous to provide a compact construction of the valve so as to minimise the overall axial length. Additionally, a compact construction is also provided by minimising the axial length of the piston. Preferably, the piston comprises an axial length being less than 50%, 40%, 30% or 20% of an axial length of the first chamber. In particular, the piston may comprise an axial length being less than 50% of a combined axial length of the first internal chamber and the working fluid chamber between a first end and a second end of each respective chamber.

Preferably, the cartridge main body comprises a step or shoulder that projects radially inward from the wall that defines the valve chamber, in the vicinity of the first chamber, so as to provide a 'annular stop' to restrict the axial stroke length of the piston and hence the stroke length of the plunger. Such an arrangement is further advantageous to provide the compact construction and to provide a controlled stroke length having a predetermined maximum axial length. Optionally, the step or shoulder may be provided by a separate component extending radially inward at the internal chamber from the main body wall. Alternatively, the step or shoulder may be formed integrally with the cartridge main body. Optionally, the axial position of the abutment, insert or shoulder may be variable so as to selectively change the maximum stroke length of the plunger.

Advantageously, minimising the axial length of the piston relative to the internal chamber provides that the piston does not shield or block the detection port(s) that would otherwise interrupt the outward flow of contaminant fluid from within the first chamber. Accordingly, the at least one detection port is provided at an axially opposite end of the internal chamber relative to the piston.

Optionally, the inlet and outlets are positioned at or towards the second end of the plunger; wherein the plunger at or towards the second end further comprises a seat to sit against the inlet or the outlet or a region therebetween and control the flow of fluid through the valve. Optionally, the valve further comprises a bushing interchangeably mounted at the plunger to allow adjustment of the position of the seat relative to the inlet or outlet to control a stroke length of the plunger. The interchangeable bushing allows adjustment of the stroke length without a need to dismantle the valve to suit specific applications or operational requirements. The collar-like bushing may be secured to the plunger via conventional attachments such as a nut or pin arrangement. Locating the seat at one end of the plunger is further advantageous for convenient attachment and interchange of the bushings.

Preferably, wherein the cartridge comprises a single body that also defines the inlet and the outlet; or the cartridge comprises a plurality of bodies such that a first body defines the working fluid chamber and a second body defines the inlet and the outlet. Accordingly, the present cartridge valve may be formed from a single-piece main body or a multiple component main body in which separate main body components are permanently or removably interconnected together to form a main body assembly in which the separate components define separate regions of the cartridge valve in particular the internal chambers and the regions of the inlet and the outlet.

According to a second aspect of the present invention there is provided a valve assembly comprising: a valve block having an inlet and an outlet; and a plurality of valves as claimed herein mounted at the block such that the respective inlets and outlets of each of the valves are provided in fluid communication with the respective inlet and outlet of the block.

Preferably, the assembly further comprises a plurality of switches and bypass valves associated with each of the plurality of valves to allow a fluid flow from the valve block inlet to the valve block outlet to bypass at least one the plurality of valves. The present valve assembly is advantageous to provide a compact valve assembly in that the valves may be positioned close to one another to form component parts of a unitary block assembly being conveniently mountable and detachable at a supply fluid network. Accordingly the need for intermediate hosing between the in-series valves is avoided which in turn reduces the number of sealing joints and minimises the risk of fluid leakage.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
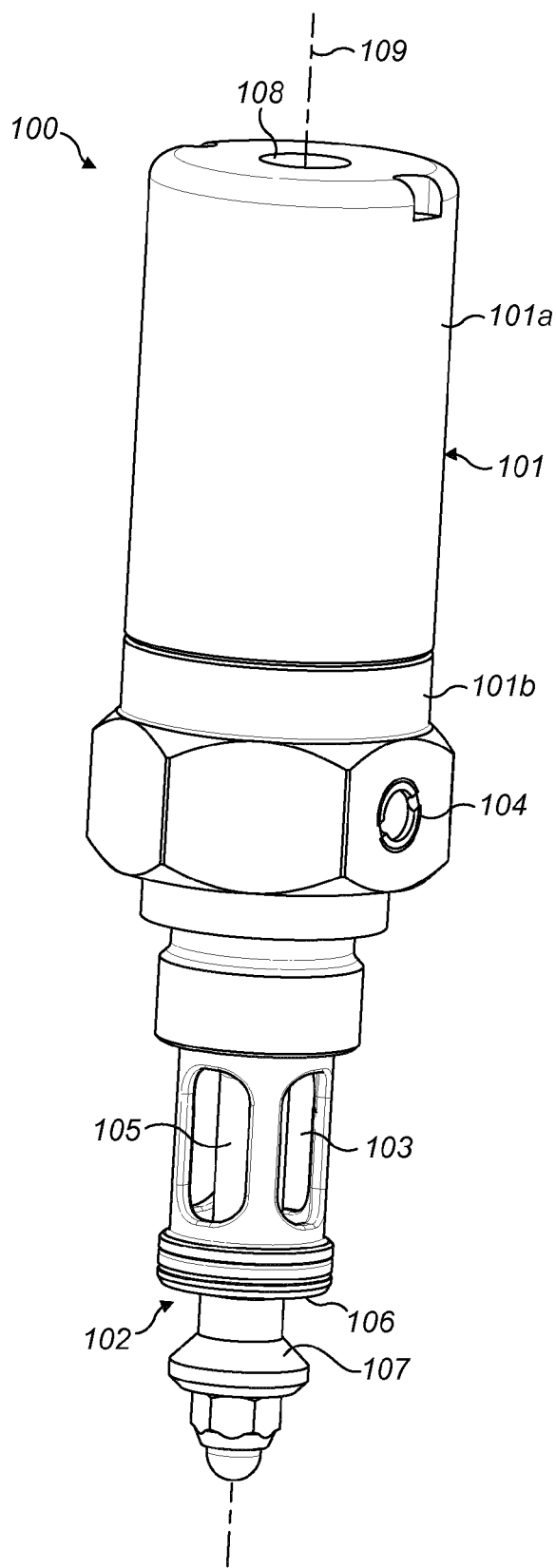
FIG. 1 is an external perspective view of a fluid flow control valve suitable for integration within a fluid network to control a supply of a fluid according to a specific implementation of the present invention.
Figure 2A:
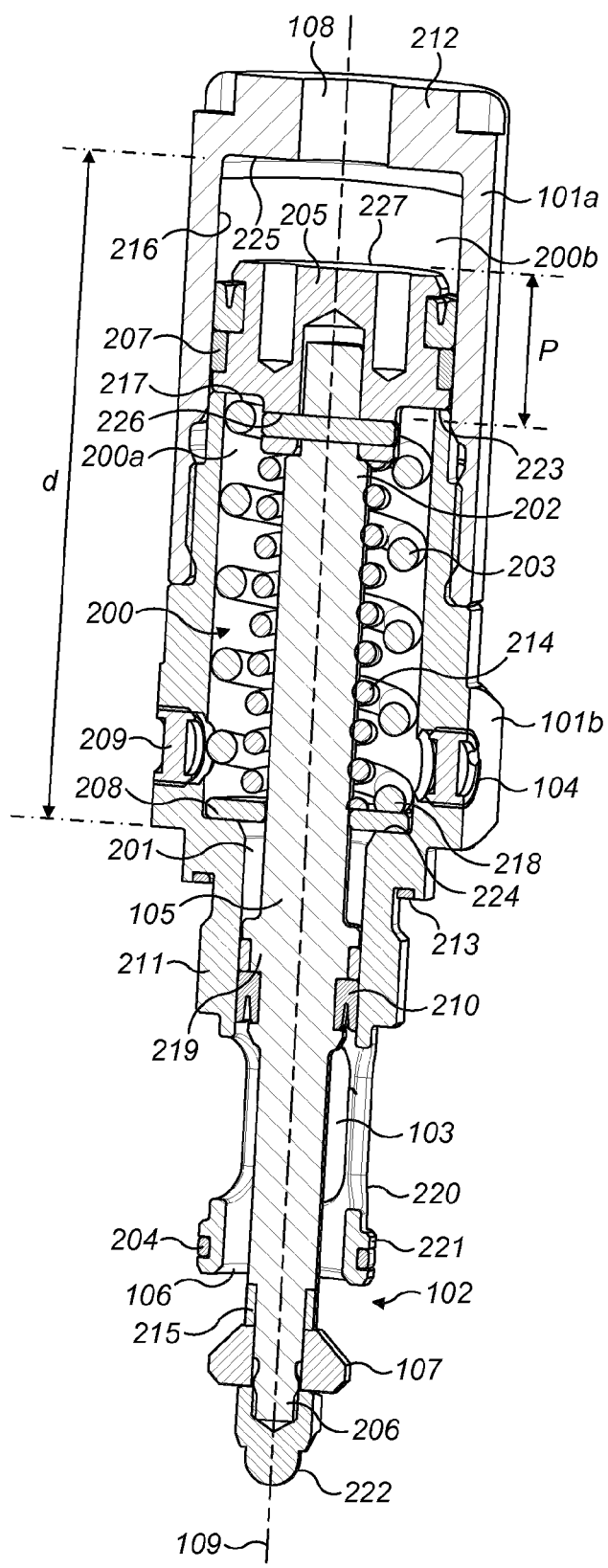
FIG. 2*a* is a perspective cross sectional view of the valve of FIG. 1.
Figure 2B:
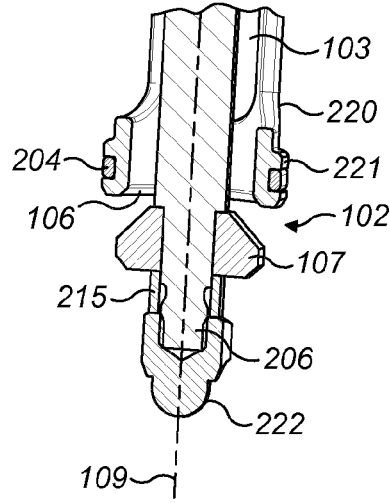
FIG. 2*b* is a further perspective cross sectional view of the inlet and outlet region of the valve of FIG. 2*a* with a seat positioned at a different axial position to that shown in FIG. 2*a*.
Figure 3:
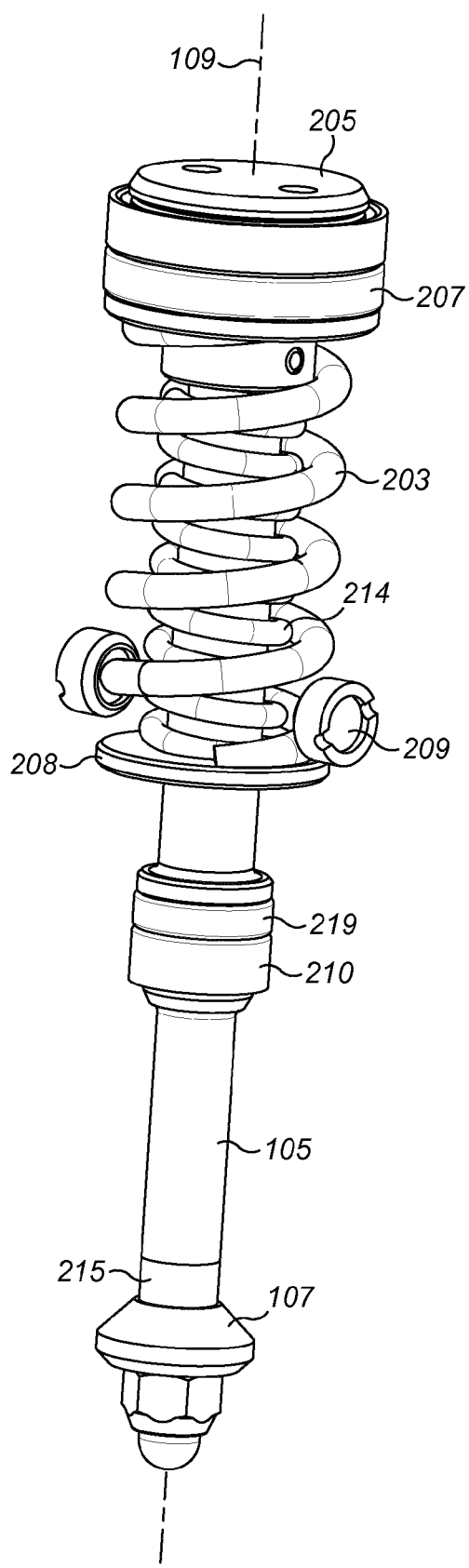
FIG. 3 is a perspective view of the valve of FIG. 1 with selected components removed for illustrative purposes.

Referring to FIGS. 1 to 3, a fluid flow control valve 100 comprises a cartridge configuration having a main body 101 formed from a substantially cylindrical first body 101*a* and a second body 101*b* extending axially from one end of first body 101*a*. The valve bodies 101*a* and 101*b* are attached by suitable inter-engaging connections to provide a unitary main body 101. First valve body 101*a* and a portion of second valve body 101*b* define an internal chamber represented generally by reference 200 that has a generally cylindrical geometry.

An elongate plunger 105 is positioned to extend axially within internal chamber 200 and centred on main axis 109 extending generally through valve 100. Plunger 105 comprises a first end 202 accommodated within chamber 200 and a second end 206 extending axially beyond the second valve body 101*b* external to chamber 200. A piston 205 is secured to plunger first end 202 and is dimensioned to fit in close touching contact with the radially inward facing surface 216 of valve body 101*a* that defines chamber 200. A seal 207 is positioned circumferentially around piston 205 to mate against valve body surface 216. Piston 205 and seal 207 effectively partition internal chamber 200 into a first internal chamber 200*a* and a second internal chamber 200*b* such that chambers 200*a* and 200*b* are prevented from fluid communication via seal 207.

A dual component coil spring 203, 214 is accommodated and extends axially within first chamber 200*a* between piston 205 and a boss 211 that form an extension of second valve body 101*b* being positioned axially furthest from first valve body 101*a*. The modular spring comprises a first coil spring 203 having a first diameter relative to axis 109 and a second coil spring 214 having a second diameter relative to axis 109 that is less than the first diameter of first spring 203. Accordingly, the helical turns of the second spring 214 sit within the helical turns of the first spring 203 with both springs centred on plunger 105 and axis 109. Additionally, a thickness (diameter) of the elongate element that forms first spring 203 is greater than the corresponding thickness (diameter) of the elongate element that forms second spring 214.

A first end 217 of each spring 203, 214 is positioned in contact with piston 205 whilst a second end 218 of each spring 203, 214 is positioned in contact with a gasket 208 that is, in turn, seated at an axially endmost region of first chamber 200*a* substantially at boss 211. Springs 203, 214 act to bias piston 205 away from boss 211 and towards a first end 212 of main body 101.

A region of boss 211 defines an internal bore 201 that forms an axial extension of internal chamber 200 and that is partitioned from first chamber 200a via gasket 208 being effective to provide a fluid tight seal. Plunger 105 comprises a neck 219 at an approximate mid-axial region between ends 202, 206. A seal 210 extends circumferentially around a region of neck 219 and is capable of axial sliding movement with neck 219 within bore 201 as the plunger 105 slides axially within internal chamber 200. A fluid tight seal is created via seal 210 that sits between neck 219 and a radially internal facing surface that defines bore 201 to prevent fluid passing axially beyond neck 219 and through bore 201 into chamber 200.

A valve seat 107 in the form of a conical collar is secured to plunger second end 206 via an annular bushing 215 interchangeably mounted at plunger second end 206. Accordingly, the relative axial position of seat 107 at plunger 105 may be adjusted by exchange of the position of bushing 215 relative to seat 107 as shown in FIG. 2B. Seat 107 is secured to plunger second end 206 via a locking nut 222. Accordingly, seat 107 is rigidly attached to plunger end 206 such that the axial movement of plunger 105 provides a corresponding direct axial movement of seat 107 relative to the valve main body 101.

A substantially cylindrical sleeve-like skirt 220 projects axially from boss 211 to surround plunger 105 towards second end 206. Skirt 220 comprises four oval apertures 103, to act as fluid flow outlets, which are aligned axially between boss 211 and an annular rim 221 that represents an axially endmost part of skirt 220. Each of the outlet apertures 103 extend substantially the full axial length of skirt 220 between rim 221 and boss 211. In a circumferential direction around skirt 220, each aperture 103 is separated by relatively thin skirt segment that extend axially between rim 221 and boss 211. The relative size, positioning and shape of configuration of each aperture 103 within skirt 220 are optimised to provide a maximum outflow whilst providing sufficient structural integrity to the inlet/outlet region of the valve.

Rim 221 is positioned axially close to seat 107 and comprises a radially inward facing chamfered opening 106 that has a shape profile configured to mate against the radially outward facing conical surface of seat 107. Accordingly, as plunger 105 moves axially along axis 109, seat 107 is displaced axially relative to chamfered opening 106. Accordingly, an inlet 102 is defined between the conical seat 107 and chamfered opening 106 and is opened and closed by the respective sliding movement of piston 205 within chamber 200.

Valve 100 further comprises external seals 204, 213 positioned respectively at rim 221 and boss 211 to enable valve 100 to be coupled in fluid tight connection to a valve mount 401 forming a part of the valve assembly 400 and fluid network described with reference to FIGS. 4 and 5.

Valve 100 comprises two detection ports 104 extending through second valve body 101b and arranged diametrically opposite relative to axis 109. Each port 104 comprises a filter insert 209 formed from a sintered metal matrix (known to those skilled in the art of filters) through which a fluid medium is capable of flowing through main body 101 between internal chamber 200 and the region surrounding valve 100. In particular, filters 209 are capable of allowing air flow into and from chamber 200 whilst protecting coil springs 203, 214 from particulates within the environments surrounding valve 100 from passing into chamber 200. Filters 209 are also capable of allowing a contaminant fluid within chamber 200 to seep outward through each port 104 so as to provide a means of detecting a liquid contaminant within chamber 200. According to the specific configuration, a diameter of opening 106 is approximately equal to an axial length of each outlet aperture 103. Such an arrangement and the relative shape and dimensions of opening 106 and apertures 103 provides an optimised compromise of various physical, mechanical and operational parameter of the valve including in particular available space, minimising pressure drop of the supply fluid; balancing the area ratios of the inlet and outlet regions; accommodating an opening pressure of the working fluid, maximising valve lifetime and the general stability of the valve in the longitudinal direction.

As will be appreciated and according to further specific implementations, main body 101 (encompassing parts 101a, 101b and optionally boss 211 and skirt 220) may be formed integrally as a single piece body.

In use, plunger 105 and piston 205 are biased by springs 203, 214 to force seat 107 into mating contact against chamfered opening 106 and to prevent a supply fluid passing into valve 100 via inlet 102. A working fluid may then be introduced via bore 108 into second chamber 200b to act on and force piston 205 axially towards boss 211. The working fluid pressure supplied into second chamber 200b is selected to be an appropriate to overcome springs 203, 214. Seat 107 is accordingly displaced axially away from chamfered opening 106 to allow a supply fluid to flow into the skirt 220 via inlet 102. The supply fluid is prevented from passing into bore 201 and chamber 200 via seal 210 and gasket 208. The supply fluid end exits valve 100 via outlets 103. Working fluid introduced into second chamber 200b is partitioned from the air filled first chamber 200a via piston 205 and seal 207. Additionally, the working fluid within second chamber 200b is axially separated and partitioned from the supply fluid within skirt 220 by the axially intermediate first chamber 200a and importantly the intermediate seals 210, 207 and gasket 208. Should any one of these seals 210, 207 and gasket 208 fail, any contaminant fluid from skirt 220 or working fluid from second chamber 200b would pass into first chamber 200a where it would exit main body 101 via ports 104. Partitioning springs 203, 214 from the working fluid within second chamber 200b and the supply fluid flowing through skirt 220 is advantageous to avoid accumulation of debris matter around and degradation of springs 203, 214. Additionally, the axial separation of the inlet 102 and outlet 103 from the working fluid chamber 200b (provided at the respective opposite ends of the valve 100) enable a compact construction.

Referring to FIG. 2a, an axial length p of piston 205 between a first axial end 227 and a second axial end 226 is substantially less than a corresponding axial length d of internal chamber 200 between a first chamber end 225 and a second chamber end 224. In particular, axial length p is substantially less than 30% and in particular approximately 25% of axial length d. Such an arrangement is advantageous to minimise the overall axial length of the valve. The valve further comprises an annular shoulder 223 that projects radially inward from inward facing surface 216. Shoulder 223 is positioned within a first axial half of chamber 200 and is configured to abut piston 205 at or in the vicinity of second end 226 so as to limit the axial movement of piston 205 within chamber 200. Accordingly, the maximum stroke length of plunger 105 (attached to piston 205) is limited and determined by the axial position of shoulder 223 relative to chamber ends 225, 224. The stroke length of plunger 105 is determined further by the relative position of seat 107 at plunger end 206.

As illustrated in FIG. 2a, piston 205 is positioned towards chamber first end 225 whilst the detection ports 104 are positioned at the opposite chamber end 224. Accordingly, piston 205 does not interfere with, shield or block detection ports 104 which is advantageous to provide rapid detection of fluid leakage into chamber 200.

The present valve arrangement is advantageous by providing closing of the inlet 102 by contact with seat 107 in direct response to the bias return force created by springs 203, 214. That is, springs 203, 214 provide that the valve is in a default closed position. This is achieved as seat 107 is attached directly to plunger 105.

Figure 4:
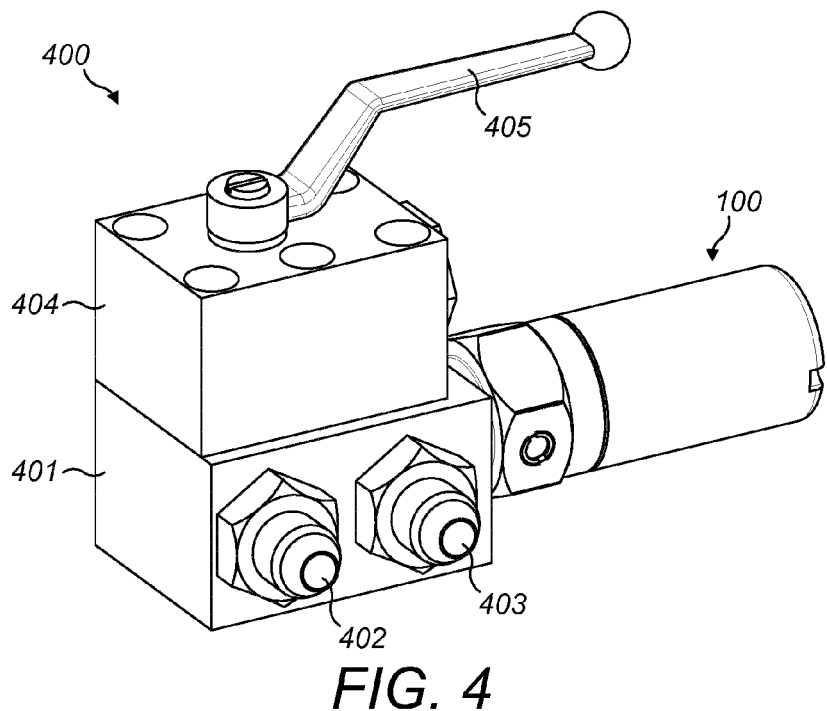
FIG. 4 is an external perspective view of the valve of FIG. 1 forming part of a valve assembly block according to a further specific implementation of the present invention.

FIG. 4 illustrates valve 100 mounted at a valve assembly block 400 to form part of a fluid supply network suitable for use with a mining machine or drill string. Valve 100 is mounted at a valve mount block 401 that comprises an inlet port 402 and an outlet port 403. Each port 402, 403 comprises a spigot for convenient attachment to supply fluid hosing and the like. A bypass valve block 404 is mounted in fluid communication at mount block 401 and comprises an internal bore valve operated by lever 405 to bypass valve 100 and allow the direct flow of the supply fluid from inlet port 402 to outlet port 403. As will be appreciated, the valve external seals 204 and 213 are configured for positioning against internal regions of mount block 401 to seal boss 211 and skirt 220 within the fluid supply network of which the mount block 401 forms a component part. The internal construction of mount block 401 and valve block 404 will be appreciated by those skilled in the art.

Figure 5:
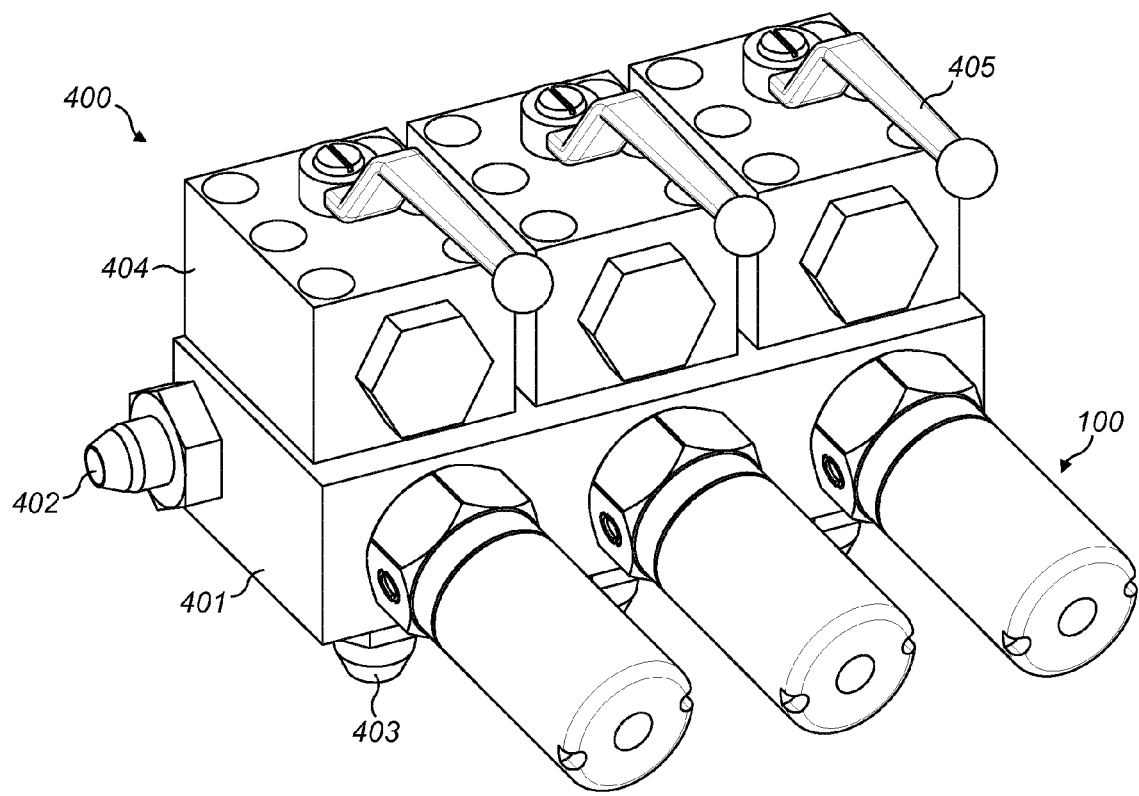
FIG. 5 is an external perspective view of a plurality of valves of FIG. 1 forming a part of a valve assembly block according to a further specific implementation of the present invention.

FIG. 5 illustrates a further specific implementation of the valve mount block 401 and bypass valve block 404 of FIG. 4 comprising a plurality of valves 100 arranged in-series with respective and independent bypass valves and associated levers 405. The present valve arrangement is advantageous to allow construction of a relative compact valve block arrangement as illustrated in FIGS. 4 and 5 in which the valves 100 may be positioned in close proximity to one another as a unitary valve mount block 401.

The invention claimed is:

1. A cartridge valve for fluid flow control comprising:
    a cartridge defining a first internal chamber and a working fluid chamber, the working fluid chamber being separated and partitioned from fluid communication with the first chamber via a piston;
    a valve plunger extending through the first chamber and having a first end and second end, the piston being attached to the plunger at or towards the first end, wherein the working fluid chamber is arranged to accommodate a working fluid and positioned to allow the working fluid to act on the piston and to provide an axial movement of the piston and the plunger within the cartridge;
    a bias member housed within the first chamber to bias the piston against the axial movement;
    an inlet and an outlet for a supply fluid to flow through a portion of the valve and be controlled by the valve via the axial movement of the plunger relative to the inlet and/or the outlet, the inlet and outlet being partitioned from the first chamber by at least one seal, the second end of the valve plunger being configured to mate with the inlet or the outlet or a region therebetween so as to close the inlet or the outlet or to block a fluid flow between the inlet and the outlet via a return force of the bias member, wherein a maximum stroke length of the plunger is adjustable; and
    a seat releasably attached at or towards the second end of the plunger to sit against the inlet or the outlet or the region therebetween and control the flow of fluid through the valve, and a bushing interchangeably mounted at the plunger in the vicinity of the seat to allow adjustment of the position of the seat relative to the inlet or outlet to control the maximum stroke length of the plunger.

2. The valve as claimed in claim 1, further comprising at least one detection port provided through the cartridge to the first chamber to allow a flow of the supply and/or working fluid from the first chamber should the first chamber be contaminated by the supply and/or working fluid.

3. The valve as claimed in claim 2, wherein the detection port includes a filter to restrict the flow of a fluid or particulates through the port and into the first chamber.

4. The valve as claimed in claim 3, wherein the detection port comprises a sintered metal matrix.

5. The valve as claimed in claim 2, wherein the detection port comprises a metal alloy having a substantially rigid structure.

6. The valve as claimed in claim 1, wherein the inlet and the outlet are positioned at or towards a first axial end of the valve and the working fluid chamber is positioned at or towards an opposite second axial end of the valve.

7. The valve as claimed in claim 1, further comprising a shoulder, abutment or insert that projects radially inward in the vicinity of first chamber to abut the piston and to restrict the axial movement of the piston.

8. The valve as claimed in claim 7, wherein an axial position of the shoulder, abutment or insert is variable so as to selectively change the maximum stroke length of the plunger.

9. The valve as claimed in claim 1, wherein the cartridge includes a working fluid port arranged to allow the working fluid to flow to and from the working fluid chamber to act on the piston.

10. The valve as claimed in claim 1, wherein the cartridge is a single body that defines the inlet and the outlet.

11. The valve as claimed in claim 1, wherein the bias member includes a first coil spring having a first diameter and a second coil spring having a second diameter, the second diameter being smaller than the first diameter.

12. The valve as claimed in claim 1, wherein the piston includes an axial length being less than 50% of a combined axial length of the first internal chamber and the working fluid chamber between a first end and a second end of each respective chamber.

13. The valve as claimed in claim 1, wherein cartridge includes a plurality of bodies, such that a first body defines the working fluid chamber and a second body defines the inlet and the outlet.

14. A valve assembly comprising:
    a valve block having an inlet and an outlet; and
    a plurality of valves mounted at the block, each of the valves including a cartridge defining a first internal chamber and a working fluid chamber, the working fluid chamber being separated and partitioned from fluid communication with the first chamber via a piston; a valve plunger extending through the first chamber and having a first end and a second end, the piston being attached to the plunger at or towards the first end, the working fluid chamber being arranged to accommodate a working fluid and positioned to allow the working fluid to act on the piston and to provide an axial movement of the piston and the plunger within the cartridge; a bias member housed within the first chamber to bias the piston against the axial movement; a valve inlet and a valve outlet for a supply fluid to flow through a portion of the valve and be controlled by the valve via the axial movement of the plunger relative to the valve inlet and/or the valve outlet, the valve inlet and outlet being partitioned from the first chamber by at least one seal, the second end of the valve plunger being configured to mate with the valve inlet or the valve outlet or a region therebetween so as to close the inlet or the outlet or to block a fluid flow between the valve inlet and the valve outlet via a return force of the bias member, wherein a maximum stroke length of the plunger is adjustable, such that respective inlets and outlets of each of the valves are provided in fluid communication with a respective inlet and outlet of the block; and a seat releasably attached at or towards the second end of the plunger to sit against the inlet or the outlet or the region therebetween and control the flow of fluid through the valve, and a bushing interchangeably mounted at the plunger in the vicinity of the seat to allow adjustment of the position of the seat relative to the inlet or outlet to control the maximum stroke length of the plunger.

15. The assembly as claimed in claim 14 further comprising a plurality of switches and bypass valves associated with each of the plurality of valves arranged to allow a fluid flow from the valve block inlet to the valve block outlet to bypass at least one the plurality of valves.

* * * * *